US010552290B2

(12) United States Patent
Amichai et al.

(10) Patent No.: US 10,552,290 B2
(45) Date of Patent: Feb. 4, 2020

(54) MEASURING USER INTERFACE RESPONSIVENESS

(71) Applicant: HEWLETT PACKARD ENTERPRISE DEVELOPMENT LP, Houston, TX (US)

(72) Inventors: Nitsan Amichai, Yehud (IL); Haim Shuvali, Yehud (IL); Guy Offer, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 280 days.

(21) Appl. No.: 15/117,484

(22) PCT Filed: May 15, 2014

(86) PCT No.: PCT/US2014/038055
§ 371 (c)(1),
(2) Date: Aug. 9, 2016

(87) PCT Pub. No.: WO2015/174976
PCT Pub. Date: Nov. 19, 2015

(65) Prior Publication Data
US 2016/0350197 A1 Dec. 1, 2016

(51) Int. Cl.
*G06F 9/44* (2018.01)
*G06F 11/34* (2006.01)
(Continued)

(52) U.S. Cl.
CPC ...... *G06F 11/3419* (2013.01); *G06F 3/04842* (2013.01); *G06F 3/04847* (2013.01);
(Continued)

(58) Field of Classification Search
CPC ............ G06F 11/3688; G06F 11/3664; G06F 11/3466; G06F 11/323; G06F 2201/865; G06F 11/3636
See application file for complete search history.

(56) References Cited

U.S. PATENT DOCUMENTS 8,464,224 B2 6/2013 Dulip et al.
8,566,696 B1 * 10/2013 Hannon ............ G06F 17/30899
715/205
(Continued)

OTHER PUBLICATIONS

AppDynamics, "What Is AppDynamics?" (Web Page), copyright 2013, 2 pages, available at http://www.appdynamics.com.
(Continued)

*Primary Examiner* — Wissam Rashid

(57) ABSTRACT

Example embodiments relate to measuring user interface (UI) responsiveness related to a UI of an application running on a computing device. An example method may include accessing a list of actionable controls, where the list indicates at least one UI control of the UI as being actionable. The method may include detecting a user interaction when a user interacts with a UI control of the UI. The method may include determining a list of change controls. The change controls are UI controls that change, refresh or load in response to the user interaction, which will ultimately be displayed on a next screen of the UI after the user interaction, and which are also on the list of actionable controls. The method may include determining a UI responsive time based on the list of change controls.

20 Claims, 6 Drawing Sheets

(51) Int. Cl.
*G06F 3/0484* (2013.01)
*G06F 11/30* (2006.01)
*G09G 3/00* (2006.01)
*G06F 9/451* (2018.01)

(52) U.S. Cl.
CPC ........ *G06F 11/302* (2013.01); *G06F 11/3438* (2013.01); *G09G 3/006* (2013.01); *G06F 9/451* (2018.02); *G06F 11/3089* (2013.01); *G06F 11/3466* (2013.01); *G06F 2201/865* (2013.01)

(56) References Cited

U.S. PATENT DOCUMENTS

| | | | | |
|---|---|---|---|---|
| 9,710,752 | B2* | 7/2017 | Salajegheh | G06N 5/04 |
| 10,068,508 | B2* | 9/2018 | Nagarajan | G09G 3/006 |
| 2006/0156315 | A1 | 7/2006 | Wood et al. | |
| 2009/0204975 | A1* | 8/2009 | Hagiu | G06F 9/542 |
| | | | | 719/314 |
| 2011/0125832 | A1* | 5/2011 | Dahl | G06F 11/3419 |
| | | | | 709/203 |
| 2011/0126210 | A1 | 5/2011 | Rivard et al. | |
| 2011/0131551 | A1* | 6/2011 | Amichai | G06F 11/3668 |
| | | | | 717/125 |
| 2013/0081001 | A1* | 3/2013 | McColl | G06F 11/3419 |
| | | | | 717/128 |
| 2013/0185643 | A1* | 7/2013 | Greifeneder | H04L 67/02 |
| | | | | 715/736 |
| 2013/0304758 | A1* | 11/2013 | Gruber | G06F 17/30976 |
| | | | | 707/769 |
| 2013/0326413 | A1* | 12/2013 | Croft | G06F 3/0481 |
| | | | | 715/811 |
| 2014/0006000 | A1 | 1/2014 | Said et al. | |
| 2015/0032760 | A1* | 1/2015 | Farahat | G06Q 30/02 |
| | | | | 707/748 |
| 2015/0033104 | A1* | 1/2015 | Zhang | G06F 17/30873 |
| | | | | 715/205 |
| 2015/0066433 | A1* | 3/2015 | Nagarajan | G09G 3/006 |
| | | | | 702/186 |
| 2015/0170035 | A1* | 6/2015 | Singh | G06N 5/022 |
| | | | | 706/46 |
| 2015/0278687 | A1* | 10/2015 | Sculley, II | G05B 13/00 |
| | | | | 706/47 |
| 2016/0063379 | A1* | 3/2016 | Adderly | G06N 5/04 |
| | | | | 706/11 |
| 2016/0078347 | A1* | 3/2016 | Salajegheh | G06N 5/04 |
| | | | | 706/12 |
| 2017/0093995 | A1 | 3/2017 | Nitsan et al. | |
| 2017/0118308 | A1* | 4/2017 | Vigeant | H04L 67/327 |
| 2017/0302521 | A1* | 10/2017 | Lui | H04L 41/0886 |

OTHER PUBLICATIONS

Dhall, S., "QTP Tutorials & Interview Questions," (Web Page), QTP Blog, copyright 2013, 4 pages, available at http://qtp.blogspot.com.

Hewlett-Packard Development Company, L.P., "Vugen 11.52: Question on LoadRunner Vugen 11.52 Trial Download?" (Web Page), May 26, 2013, 3 pages, available at htp://h30499.www3.hp.com/t5/LoadRunner-Support-Forum/Vugen-11-52-Question-on-LoadRunner-Vugen-11-52-trial-download/td-p/6073831#.U1k9mPldXZY.

International Search Report & Written Opinion received in PCT Application No. PCT/US2014/038055, dated Jan. 28, 2015, 10 pages.

Luther, V., "Moving Past Page Load Time," (Web Page), Sep. 11, 2013, 5 pages, available at http://www.speedawarenessmonth.com/moving-past-page-load-time/.

Mielczarek, T., "Measuring UI Responsiveness," (Web Page), Jun. 27, 2011, 3 pages, available at https://blog.mozilla.org/ted/2011/06/27/measuring-ui-responsiveness/.

New Relic, Inc., "Application Monitoring for All Your Web Apps," (Web Page), copyright 2014, 6 pages, available at http://newrelic.com.

Oksnevad, D., "Time to Interact: A New Metric for Measuring User Experience," (Web Page), Feb. 3, 2014, 5 pages, available at http://www.dotcom-monitor.com/blog/index.php/web-performance-tech-tips/time-to-interact-new-metric-measuring-user-experience/.

Soasta, "Mobile Performance Testing," (Web Page), copyright 2014, 1 page, available at http://info.soasta.com.

Suitor, K., "Application Response Measurement—Improving QoS on the WAN," (Web Page), Jan. 19, 2011, 1 page, avaiiable at http://www.exinda.com/blog/article/application-response-measurement-improving-qos-on-the-wan#.Uwr3BrWcWl0.

* cited by examiner

MEASURING USER INTERFACE RESPONSIVENESS

BACKGROUND

Applications (e.g., computer software) often include a user interface (UI) that displays screens to users of the application. When various actions are taken by the user with respect to an application, a UI screen may change, refresh or load. In general, it is desirable for UI screens to change, refresh or load in a timely manner, for example, such that a user is not prevented from using the application because a UI screen is loading.

BRIEF DESCRIPTION OF THE DRAWINGS

The following detailed description references the drawings, wherein.

DETAILED DESCRIPTION

Figure 1:
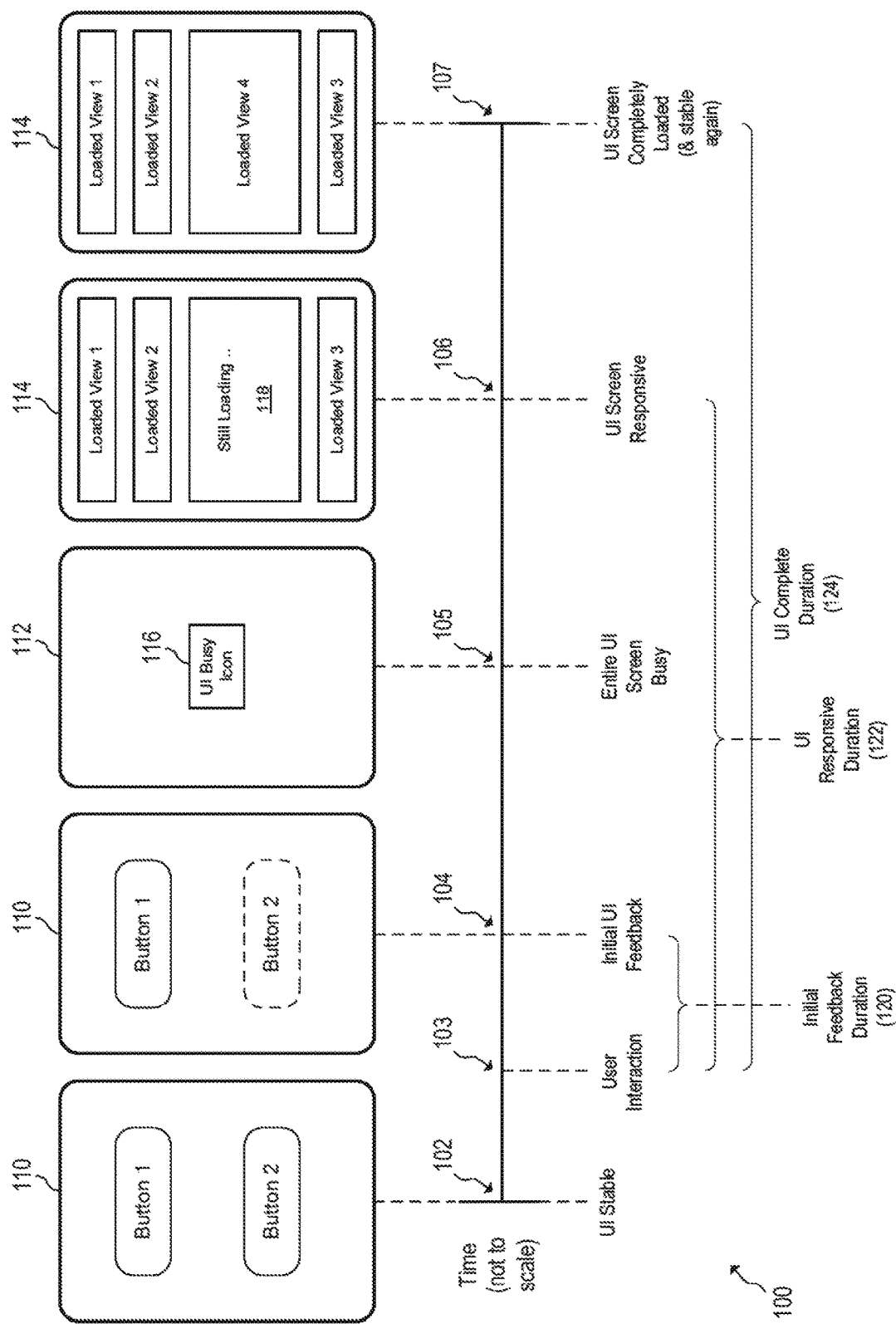
FIG. 1 shows a timeline with associated example user interface screens and associated notations to explain user interface timing concepts.

As mentioned above, for an application (e.g., computer software), it is desirable for user interface (UI) screens to change, refresh or load in a timely manner, for example, such that a user is not prevented from using the application because a UI screen is loading. Therefore, it may be useful to measure how quickly UI screens change, refresh or load, for example, such that an individual or entity (e.g., the owner of the application) can track how its application is performing. Specifically, it may be useful to measure UI performance for applications running on real computing devices (i.e., clients) being used by real users in the real world. In order to track data regarding the execution of applications, the individual or entity may use a monitoring tool running on a monitoring system (e.g., a server). The monitoring tool may collect data from various clients running the application, and may aid the individual or entity in analyzing the data. Specifically, agents running on the various clients may collect information about the execution of the application and may send data to the monitoring tool.

Some monitoring tools (e.g., production monitoring tools) may track application performance by following network transactions (e.g., HTTP transactions) between the client device and the monitoring system. These network transactions may or may not have a relationship to the user interface. For example, many network transactions may occur without the user interface updating. Thus, network transactions are a poor proxy for UI experience. Additionally, these solutions do not provide insight into device (i.e., client) level performance, for example, which may be dependent on local client issues such as storage levels, other processes running, etc. Some monitoring tools may track application performance by analyzing background (e.g., processing) activities on the client device. However, such monitoring tools do not focus on the performance of the user interface. It may be desirable to track application performance at the user level (e.g., referred to as "user experience monitoring/testing"). Some monitoring tools may track user level application performance by analyzing the time elapsed until the UI screen is completely rendered or loaded. However, such monitoring tools do not consider the time elapsed until the UI screen is responsive or partially responsive. Such a time measurement may be an important indicator of user level or user-perceived application performance because a user may be able to interact with various portions of the UI screen before the complete UI screen is rendered. User-perceived application performance may be related to user satisfaction with an application.

Some monitoring tools claim to track user level application performance by analyzing a "time to interact" of the user interface. Among other differences, these monitoring tools measure this "time to interact" based on a single or immediate run of the application being tested. For example, an agent running on the client may attempt to analyze the loading of the UI once, in isolation. For one such solution, the agent monitors the UI screens as a form of video (or frame by frame) analysis, looking for when visible content is loaded. These solutions do not, among other differences, use data from multiple user interactions on multiple devices to determine user interface responsiveness. Additionally, these solutions do not distinguish between the loading of UI content that users may frequently interact with and UI content that users rarely or never interact with. It should be noted that, if user level or user perceived application performance is an important indicator of application performance, than this indicator should be tied, as closely as possible, to actual user perception and actual application use, as opposed to some other metrics (e.g., the loading of any visible content) that may be only loosely related to user-perceived UI performance.

The present disclosure describes measuring user interface responsiveness related to a user interface of an application running on a computing device. The present disclosure may describe accessing a list of actionable controls where the actionable controls are user interface controls that users commonly interact with. In some examples, the list of actionable controls may be based on crowd-sourced user interaction data from multiple computing devices, and may be based on multiple users on multiple computing devices running and interacting with the application. In other examples, the list of actionable controls may be based on user interaction data from a single device (e.g., spanning multiple user sessions on that device), where the single device is the same device on which user interface responsiveness is measured. The present disclosure may describe determining, in the computing device, a UI responsive time based on determining which UI controls of the user interface change, refresh or load (and will ultimately be displayed on the next UI screen) in response to a user interaction with a UI control, and in particular, which of these UI controls are also on the list of actionable controls. These UI controls may be referred to as "change controls". For example, the UI responsive time may be determined when the first change control appears on the user interface. In this example, as soon as one UI control on the list of actionable controls is present, the user interface may be considered responsive in a meaningful way. Thus, the UI responsive time may be an indicator that is tied, as closely as possible, to actual user perception.

The techniques of the present disclosure may be used with any monitoring or testing tools that are interested in user interface response time and/or application response time. Thus, these techniques may be used with pre-production tools (i.e., testing tools) and with production tools (i.e., monitoring tools). For simplicity, various descriptions and drawings herein may refer to a monitoring tool and/or may refer to clients running applications in the real world; however, it should be understood that the descriptions here may apply equally to a pre-production/testing environment. Thus, any mention of monitoring tool (vs. testing tool) or real client devices or real users, etc. should not be taken as a limitation on the applicability of the techniques described herein.

For the purposes of the present disclosure, the term "UI screen," or just screen, may refer to the main or high level UI item displayed by a user interface (UI) of an application. For example, if an application is displaying a window that is consuming the entire display of a computing device, that high level window may be a UI screen. A UI screen need not take up the entire display of a computing device, but a UI screen may be the largest, most encompassing UI item that is displayed by the application (e.g., a "modal dialog"). Each UI screen may include a number of UI views and a number of UI controls. For the purposes of the present disclosure, the term "UI view" may refer to a sub portion of the UI screen or any UI item (usually displayed within the UI screen). For example, within the high level window mentioned above, there may be a number of sub windows or frames, each of which may be a UI view. UI views may also include further nested UI views. For example, each sub window or frame may include smaller sub windows or frames, or buttons, text entry boxes, text areas or the like. A UI view may also be referred to as a widget. For the purposes of the present disclosure, the term "UI control" may refer to a UI item that a user can interact with to, in many cases, cause changes to occur in the UI screen or at least one of the included UI views. For example, a UI control could be a button, hyperlink, scroll bar or various other types of items with which a user can interact.

As an initial matter, it may be useful to define some UI timing related concepts that may be used throughout the present disclosure. FIG. 1 shows a timeline 100 with associated example UI screens and associated notations. The progression through the timeline of FIG. 1 may show an example sequence that may occur when a user interacts with a UI (e.g., a UI control) of an application, including the UI activities that follow after the user interaction. For the most part, FIG. 1 shows "foreground" (e.g., UI) activities that occur, but there may be a number of "background" activities that happen as well.

As can be seen in FIG. 1, at time 102, a UI screen 110 is stable (e.g., it is not changing, and there is little to no background activity). At time 102, the UI screen 110 includes two example buttons (Button 1 and Button 2). At time 103, a user may interact with the UI screen, for example, by activating (e.g., pressing) Button 2. At time 104, the UI screen may change to indicate that Button 2 was pressed, for example, by "greying out" Button 2. This nearly immediate indication may be referred to as initial UI feedback. Pressing Button 2 may cause some action to occur in the application, including some change in the UI screen (e.g., changing to UI screen 112 and then to 114). At time 105, the entire UI screen 112 may be busy, which means a user may not be able to interact with any part of the UI screen (i.e., the entire UI screen may be blocked). As an example, a UI busy icon 116 may display on the UI screen 112, and the rest of the UI screen may be blank or greyed out.

At time 106, at least one portion (e.g., Loaded View 1, Loaded View 2 and Loaded View 3) of the next UI screen 114 may be loaded (e.g., able to accept user interaction) and other portions may still be loading. At this time, the application may, for example, load a skeleton of the next UI screen 114 and some UI items (e.g., UI controls) may be visible and able to accept user interaction. For the UI portions that are still loading, the application may display placeholders (e.g., 118). Some slow loading items such as images, videos, etc. may be displayed as these placeholders initially. At time 107, the entire UI screen 110 may be loaded, meaning that all UI views within the UI screen are rendered and able to accept user interaction. For example, more UI items may be loaded into the skeleton in the place of placeholders. At time 107, the UI screen 114 is stable. Finally, at some point after time 107, associated background activities may complete.

A number of time durations may be defined based on FIG. 1 and the preceding description. Initial feedback duration (120) may be the difference between time 103 and 104. UI responsive duration (122) may be the difference between time 103 and 106. Finally, UI complete duration (124) may be the difference between time 103 and 107. It should be noted that some monitoring tools may track user level application performance by analyzing the UI complete time duration (124), which is the time until the UI screen is completely rendered or loaded. The present disclosure may focus on UI responsive duration (122). This UI responsive duration may be used as a Key Performance Indicator (KPI) that provides insight into user-level UI responsiveness. This UI responsive duration may also be used as an industry benchmark for comparing various application UI's, for example, because UI responsiveness can be measured and compared regardless of what background activities are running.

Figure 2:
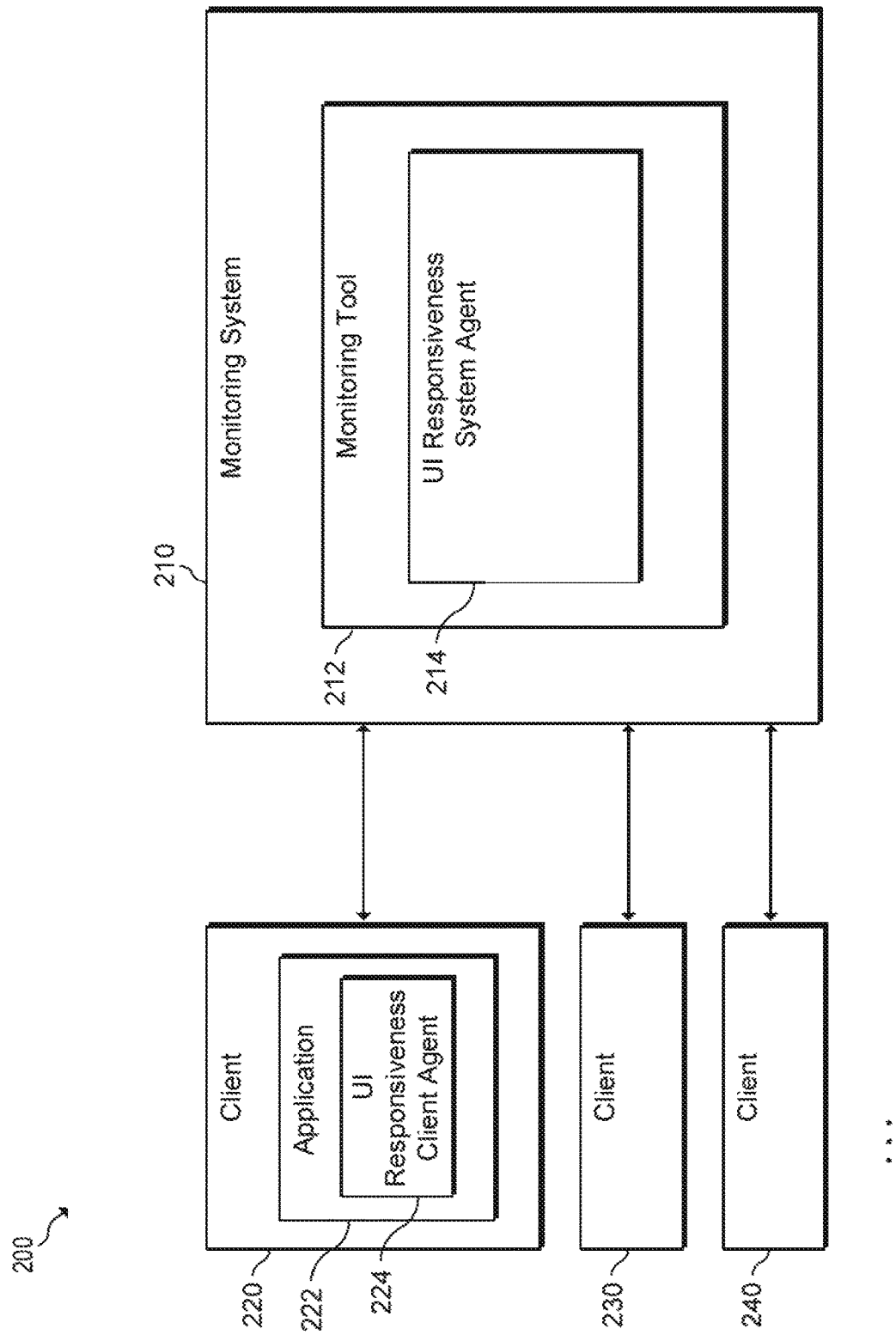
FIG. 2 is a block diagram of an example computing environment in which measuring user interface responsiveness may be useful.

FIG. 2 is a block diagram of an example computing environment 200 in which measuring user interface responsiveness may be useful. Computing environment 200 may include a monitoring system 210 and a number of clients (e.g., 220, 230, 240, etc.). The clients may communicate with system 210 over at least one network. In other words, system 210 may be remote to the clients. Such a network may be any wired or wireless network, and may include any number of hubs, routers, switches, cell towers or the like. Such a network may be, for example, part of a cellular network, part of the internet, part of an intranet and/or other type of network. Each client (e.g., 220) may measure the responsiveness of a user interface of an application (e.g., 222) running on the client device. Each client may receive information from the monitoring system 210 regarding which UI controls are "actionable", as will be described in more detail below. Each client may use this information to determine a UI responsive duration for the application.

Monitoring system 210 may include at least one computing device that is capable of communicating with various clients (e.g., 220, 230, 240, etc.). The term "system" may be used to refer to a single computing device or multiple computing devices that communicate with each other (e.g., via a network) and operate together to provide a service. Monitoring system 210 may include a monitoring tool 212 that runs on monitoring system 210.

Monitoring tool 212 may be any type of application testing tool (e.g., a pre-production testing too, a production monitoring tool, a real user monitoring tool, etc.) that receives execution information (e.g., execution reports, errors, performance information, etc.) from various applications (e.g., 222) running on various clients (e.g., 220, 230, 240, etc.). Monitoring tool 212 may include instructions (e.g., stored on a machine-readable storage medium of system 210) that, when executed (e.g., by a processor of system 210), implement the functionality of the monitoring tool 212. Alternatively or in addition, monitoring tool 212 may include electronic circuitry (i.e., hardware) that implements the functionality of the monitoring tool 212. Monitoring system 210 may include a UI responsiveness system agent 214. UI responsiveness system agent 214 may be included as part of monitoring tool 212 or may be independent of (e.g., in communication with) monitoring tool 212.

The following describes what is meant by "actionable" controls, for the purposes of this disclosure. In practice, when users interact with user interface controls (e.g., buttons, hyperlinks, menus, etc.) of an application, it is typically the case that users only interact with a portion (e.g., a small portion) of the total available UI controls offered by the application. Additionally, some UI controls are much more commonly used than other UI controls, and some UI controls are more vital to the operation of the application user interface than are other UI controls. Thus, if user level or user perceived application performance is an important indicator of application performance, than this indicator should be related to the responsiveness of important UI controls. These important UI controls are referred to as "actionable" controls.

Monitoring tool 212 (e.g., via UI responsiveness system agent 214) may create and maintain a list of actionable controls for various applications (e.g., for application 222). To create this list, monitoring tool 212 may receive indications of activated UI controls from various clients (e.g., 220, 230, 240) that are running the same application (or similar applications), e.g., in a crowd-sourcing manner. The term "crowd-sourcing" may generally refer to collecting data by soliciting data contributions from a group (e.g., a large group) of users and/or devices, for example, real devices being used by real users (e.g., running production applications) in the real world. The term crowd-sourcing may further be defined with reference to the various examples described herein.

In some examples, each time a user, on one of the clients, interacts with a UI control, a unique control ID for that UI control may be sent to the monitoring tool. For each activated UI control, monitoring tool 212 may receive a control ID. The term "control ID" may refer to a unique ID that indicates the UI control (and perhaps the UI view and/or other information as well). In some examples, the control IDs may be the same across platforms (e.g., iPhone, iPad, Android, web, etc.). Thus, a particular button in an application for one of these platforms may have the same control ID as a similar button in an application for another one of these platforms. The control IDs may be the same across all users/client devices. Thus, a particular button activated by a first user on a first device may have the same control ID as a similar button activated by a second user on a second device. By ensuring that control IDs are the same for similar buttons, the monitoring tool 212 can tabulate crowd-sourced control ID data (i.e., user interaction data) to determine commonly used UI controls.

Monitoring tool 212 may then analyze all the control ID's received, and may maintain (e.g., dynamically) a list of important (e.g., commonly used) UI controls. These are referred to as "actionable" controls. Monitoring tool 212 may then provide (e.g., on an ongoing basis) these actionable controls to the various clients (e.g., 220, 230, 240). The various clients may then use these actionable controls to determine when these types of UI controls are loaded or responsive, to determine when a user interface is responsive in a meaningful manner (e.g., to calculate a UI responsive duration value). Monitoring tool 212 (e.g., via UI responsiveness system agent 214) may also receive UI responsive duration measurements from various clients such that a developer may analyze the performance of the application running on various devices.

In some examples, each client (e.g., client 220), for example, via UI responsiveness client agent 224, may create and maintain a list of actionable controls for various applications (e.g., for application 222), for example, instead of monitoring tool 212 creating and maintaining the list. To create this list, a particular client (e.g., client 220) may collect indications (e.g., control IDs as described above) of UI controls activated by the immediate client (e.g., 220 in this example) while running the application. These indications of activated UI controls (i.e., user interaction data) may be collected on the immediate client during multiple user sessions on that client. Thus, in these examples, the user interaction data may be from a single device only (the immediate device), and may be stored locally and used locally to create the list of actionable controls. In these examples, the client may not need to receive actionable control information from a monitoring system. To keep the descriptions herein clear and of reasonable length, various descriptions herein refer to clients receiving actionable control information from a monitoring system; however the alternative situation of clients creating and maintaining their own lists of actionable controls is contemplated by this disclosure.

Client 220 may be any type of computing device that is capable of communicating (e.g., with a monitoring system) over a network. Client 220 may be, for example, a smartphone, cell phone, tablet, phablet, laptop, desktop, server, application-specific computing device or any other type of computing device. Client 220 may be described specifically herein, but it should be understood that clients 230, 240 and any other clients in computing environment 200 may be similar to client 220 as described herein. Client 220 may include an application 222 that runs on the client 220. Application 222 may include instructions (e.g., stored on a machine-readable storage medium of client 220) that, when executed (e.g., by a processor of client 220), implement the functionality of the application. Alternatively or in addition, application 222 may include electronic circuitry (i.e., hardware) that implements the functionality of the application. Application 222 may be any type of application, for example, a software program, web browser, web application, mobile application or the like.

Client 220 may include a UI responsiveness client agent 224. UI responsiveness client agent 224 may be included as part of application 222 or may be independent of (e.g., in communication with) application 222. UI responsiveness client agent 224 may be part of a larger application execution reporting tool that sends various pieces of execution information regarding applications (e.g., 222) to a monitoring tool (e.g., 212). UI responsiveness client agent 224 and/or the larger application execution reporting tool may be provided to users (e.g., creators of applications such as 222) in the form of an SDK (Software Development Kit) library that the users can embed inside their applications. Then when users of the client (e.g., 220) run the application (e.g., 222), the UI responsiveness client agent 224 and/or the larger application execution reporting tool may be running in the background, for example, to monitor events that happen with regard to the client 220, for example, user actions, timing events, network events, sensor data events (e.g., camera events such as photographs taken) and the like. In some situations, users of client 220 may be notified that their actions may be monitored and may be given the option to opt-in or opt-out of such monitoring.

UI responsiveness client agent 224 may measure the responsiveness of a user interface of an application (e.g., 222) running on the client 220. UI responsiveness client agent 224 may receive information from the monitoring system 210 (e.g., regarding which UI controls are "actionable"). UI responsiveness client agent 224 may calculate a UI responsive time and/or duration for the application 222. UI responsiveness client agent 224 may send useful information (e.g., the UI responsive duration) to the monitoring system 210. More details regarding the UI responsiveness client agent may be provided below with regard to the description of UI responsiveness client agent 300 of FIG. 3.

Figure 3:
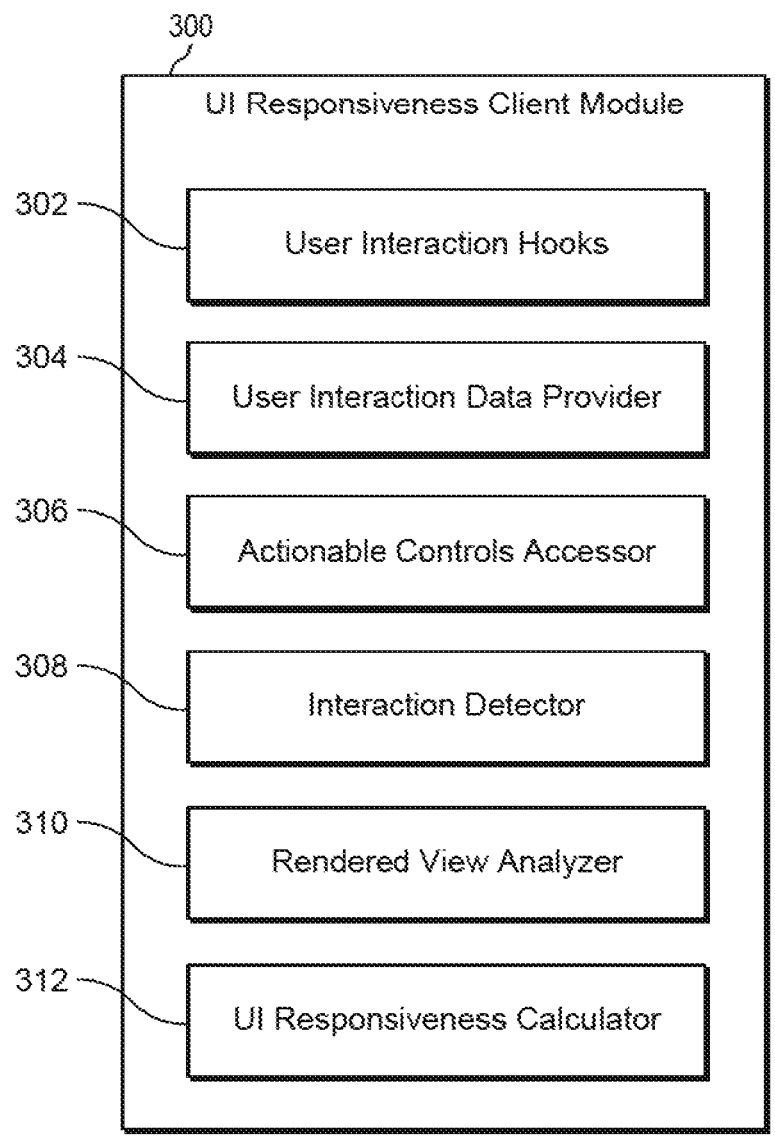
FIG. 3 is a block diagram of an example user interface responsiveness client agent.

FIG. 3 is a block diagram of an example UI responsiveness client agent 300, which may be similar to UI responsiveness client agent 224 of FIG. 2. UI responsiveness client agent 300 may include user interaction hooks 302, a user interaction data provider 304, an actionable controls accessor 306, an interaction detector 308, a rendered view analyzer 310 and a UI responsiveness calculator 312. Each of these components and UI responsiveness client agent 300 overall may each include instructions (e.g., stored on a machine-readable storage medium of client 220) that, when executed (e.g., by a processor of client 220), implement the functionality of the particular component. Alternatively or in addition, each of these components and UI responsiveness client agent 300 overall may include electronic circuitry (i.e., hardware) that implements the functionality of the particular component.

User interaction hooks 302 may interact with the platform on which the application (e.g., 222) is running and receive indications of various events identified by the platform. Example platforms include mobile operating systems (e.g., iOS, Android), various other computing device operating systems, and various web browsers. Each of these platforms may identify various events related to applications running on the platform and may allow for these events to be "hooked" into. User interaction hooks 302 may hook into these events and thus may access event data such as when each user action with respect to the user interface occurs, when a new screen is displayed in the user interface, when a UI view of the user interface is changed, refreshed or loaded (e.g., both start and end time). Thus, user interaction hooks 302 have access to key user interactions with the user interface (e.g., user interface controls) and information about user interface items.

User interaction data provider 304 may provide user interaction data (e.g., control IDs) for various UI controls that a user interacts with. This user interaction data may be sent to a monitoring system (e.g., 210). Alternatively, this user interaction data may be collected and stored on the immediate client device. As mentioned above, each time a user on the client device interacts with a UI control, a unique control ID for that UI control may generated, and may be sent to the monitoring system and/or stored locally. User interaction data provider 304 may determine when a user interacts with a UI control (e.g., by interacting with user interaction hooks 302) and may then match a unique control ID with the UI control and send the control ID to the monitoring system. As mentioned above, the control IDs for the same or similar UI controls across platforms and/or across different users/client devices may be the same; thus, user interaction data provider 304 may match control IDs to UI controls in a manner to maintain this unified control ID assignment scheme.

User interaction data provider 304 may send (e.g., continuously, periodically, etc.) control IDs of activated UI controls to the monitoring system (e.g., 210). Additionally, user interaction data providers in various other client devices may send control IDs to the monitoring system. This continual crowd-sourcing data may then be used by the monitoring system to determine and maintain (e.g., dynamically) a list of "actionable controls," as described above. The monitoring system (e.g., 210) may then send (e.g., continuously, periodically, etc.) this list of actionable controls back to the various client devices. As mentioned above, in other examples, user interaction data may be collected locally on each device and the device may locally use this data to create and maintain a list of actionable controls.

Actionable controls accessor 306 may receive (e.g., continuously, periodically, etc.) the list of actionable controls from the monitoring system (e.g., 210). Other client devices may also receive the list of actionable controls from the monitoring system (e.g., 210). In this respect, each participating client device may know (e.g., in an up-to-date manner) which UI controls for the particular application are commonly used (e.g., by various users of various devices) and which contribute to the user-perceived performance of the application in a meaningful manner. Actionable controls accessor 306 may access the list of actionable controls, whether they are received from a monitoring system or created locally.

Interaction detector 308 may determine when a user interacts with a UI control (e.g., by interacting with user interaction hooks 302) that may cause the associated UI screen (or a portion of it) to change. Interaction detector 308 may make this determination for the purpose of determining UI responsiveness as an application performance metric. Interaction detector 308 may differ from user interaction data provider 304 in that user interaction data provider 304 may detect user interactions for the purpose of supplying crowd-sourcing UI control use data to the monitoring system or to supply single-device UI control use data for local storage and to create the list of actionable controls. In some examples, interaction detector 308 and user interaction data provider 304 may be the same component or may share some parts. In other examples, these may be distinct components. With referenced to FIG. 1 as one specific example, the detection of user interaction performed by interaction detector 308 may happen at a time that can be charted similar to user interaction time 103 of FIG. 1.

Rendered view analyzer 310 may detect all the UI views that change when a user interacts with a UI control (as detected by interaction detector 308). For example, if a user clicks a "next" button on a UI screen, the entire UI screen or a portion of the UI screen (e.g., at least one UI view) may change, refresh or load. The user interaction with the next button may be detected by the interaction detector 308. Then, based on this detection, rendered view analyzer 310 may determine all the UI views that change because of the user interaction. Rendered view analyzer 310 may detect which UI views change by interacting with user interaction hooks 302. Rendered view analyzer 310 may determine, out all the UI views that change, refresh or load (and will ultimately be displayed on the next UI screen after the user interaction is detected), which ones are "actionable controls." This determination of which ones are actionable controls may be based on information received by actionable controls accessor 306 (from the monitoring system). Thus, rendered view analyzer 310 may determine which actionable controls (e.g., commonly used UI controls) changed based on the user interaction (and will ultimately be displayed on the next UI screen), and these may be referred to as "change controls," Furthermore, rendered view analyzer 310 may determine timing specifics (e.g., start load time, end load time, etc.) with regard to the changing of these actionable controls, for example, by interacting with user interaction hooks 302.

UI responsiveness calculator 312 may determine, e.g., after a user interaction detected by interaction detector 308, when the user interface is "responsive" (e.g., similar to time 106 in FIG. 1), and may also determine a UI responsive duration (e.g., similar to time duration D2 in FIG. 1), which is the difference between the time when the user interaction is detected and when the user interface is determined to be "responsive."

The time when the user interface is "responsive" may be determined in various ways. For example, UI responsiveness calculator 312 may determine when the first change control has appeared. In other words, UI responsive duration may be calculated as equal to min (T1, . . . , Tn) minus the time of the detected user interaction (where T1, . . . , Tn are times respectively associated with when change controls become visible). As another example, UI responsiveness calculator 312 may determine when the first change control has fully loaded. As another example, UI responsiveness calculator 312 may determine when a subset (e.g., a threshold, majority or the like) of all the soon-to-be available change controls are visible or fully loaded. As another example, UI responsiveness calculator 312 may determine when at least one of the change controls is itself "responsive". This may require certain user interaction hooks (e.g., part of component 302) to access information about when certain UI views or widgets are responsive (e.g., before being fully loaded). To determine when the user interface is "responsive," the UI responsiveness calculator 312 may not consider UI views that are not classified as "actionable controls."

To determine when the user interface is "responsive," the UI responsiveness calculator 312 may not consider UI views that do not change as a result of the currently considered user interaction. For example, some UI screens may include a header bar (e.g., with screen navigation buttons) or other static or semi-static portions of the UI screen. In the example with these static or semi-static portions, the portion of the UI screen that actually changes in response to the user interaction may be analyzed, and the portion that does not change may be ignored. In other words, the techniques described herein may be applied to changing portions of a UI screen or to a whole UI screen, e.g., if the whole UI screen changes.

Figure 4:
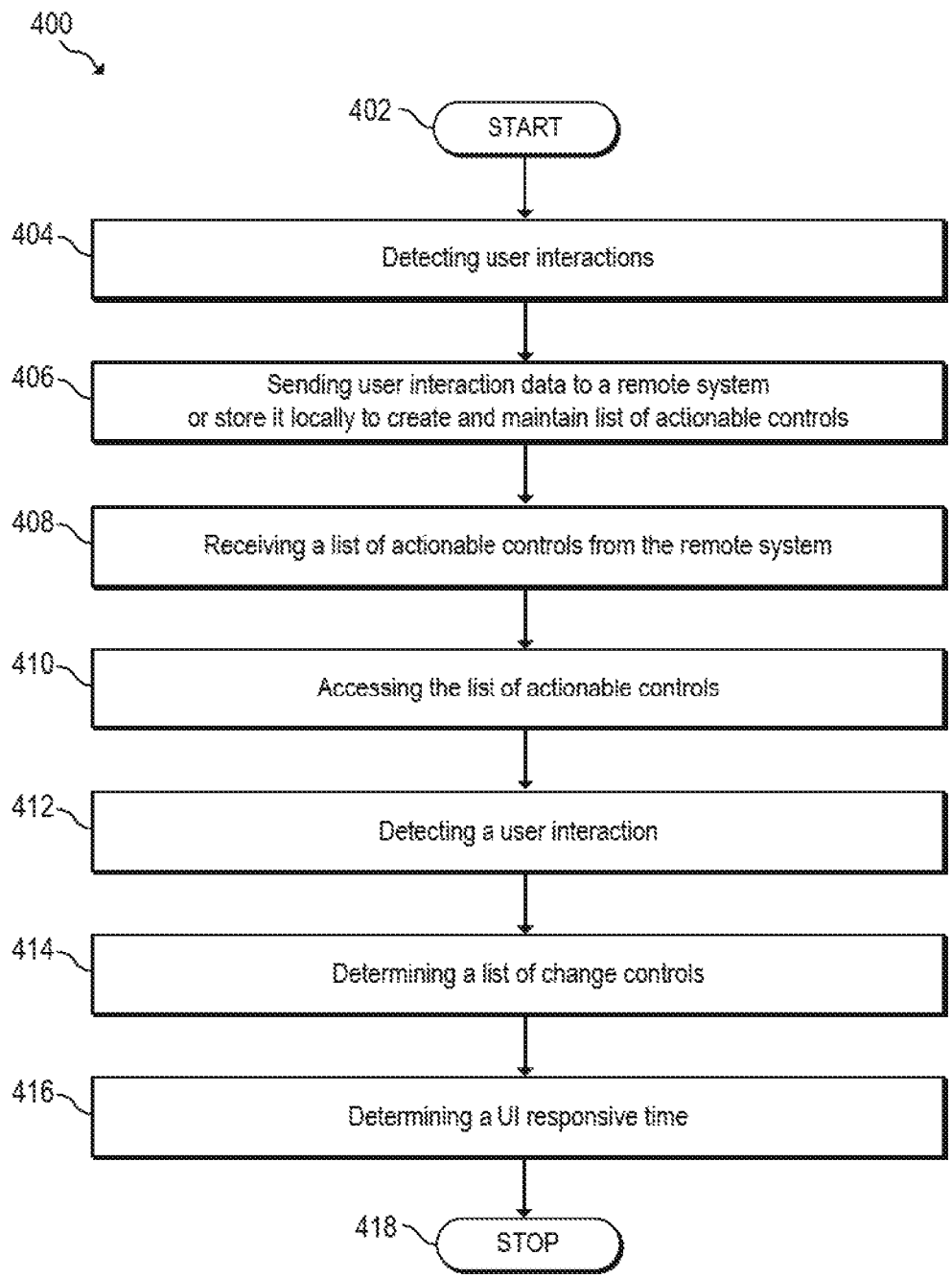
FIG. 4 is a flowchart of an example method for measuring user interface responsiveness.

FIG. 4 is a flowchart of an example method 400 for measuring user interface responsiveness. Method 400 may be described below as being executed or performed by a computing device, for example, client 220 of FIG. 2. Other suitable systems and/or computing devices may be used as well. Method 400 may be implemented in the form of executable instructions stored on at least one machine-readable storage medium of the computing device and executed by at least one processor of the computing device. Alternatively or in addition, method 400 may be implemented in the form of electronic circuitry (e.g., hardware). In alternate embodiments of the present disclosure, one or more steps of method 400 may be executed substantially concurrently or in a different order than shown in FIG. 4. In alternate embodiments of the present disclosure, method 400 may include more or less steps than are shown in FIG. 4. In some embodiments, one or more of the steps of method 400 may, at certain times, be ongoing and/or may repeat.

Method 400 may start at step 402 and continue to step 404, where a computing device may detect (e.g., via component 304 of FIG. 3) user interactions with a user interface of the computing device, e.g., for crowd-source user interaction data purposes or for local data collection purposes. At step 406, the computing device may send (e.g., via component 304 of FIG. 3) the user interaction data to a remote system (e.g., a monitoring system such as 210 of FIG. 2). Alternatively, at step 406, the computing device may store the user interaction data locally and may use this data (e.g., along with data from other user sessions on the application) to create and maintain a list of actionable controls. At step 408, the computing device may receive (e.g., via component 306 of FIG. 3) a list of actionable controls from the remote system. In some examples, step 408 may not exist in method 400.

At step 410, the computing device may access (e.g., via component 306 of FIG. 3) the list of actionable controls. At step 412, the computing device may detect (e.g., via component 308 of FIG. 3) user interactions with a user interface of the computing device, e.g., for application performance purposes. At step 414, the computing device may determine a list of change controls (e.g., via component 310 of FIG. 3), using the list of actionable controls, as is described in detail above. At step 416, the computing device may determine a UI responsive time, as is described in detail above. Method 400 may eventually continue to step 418, where method 400 may stop.

Figure 5:
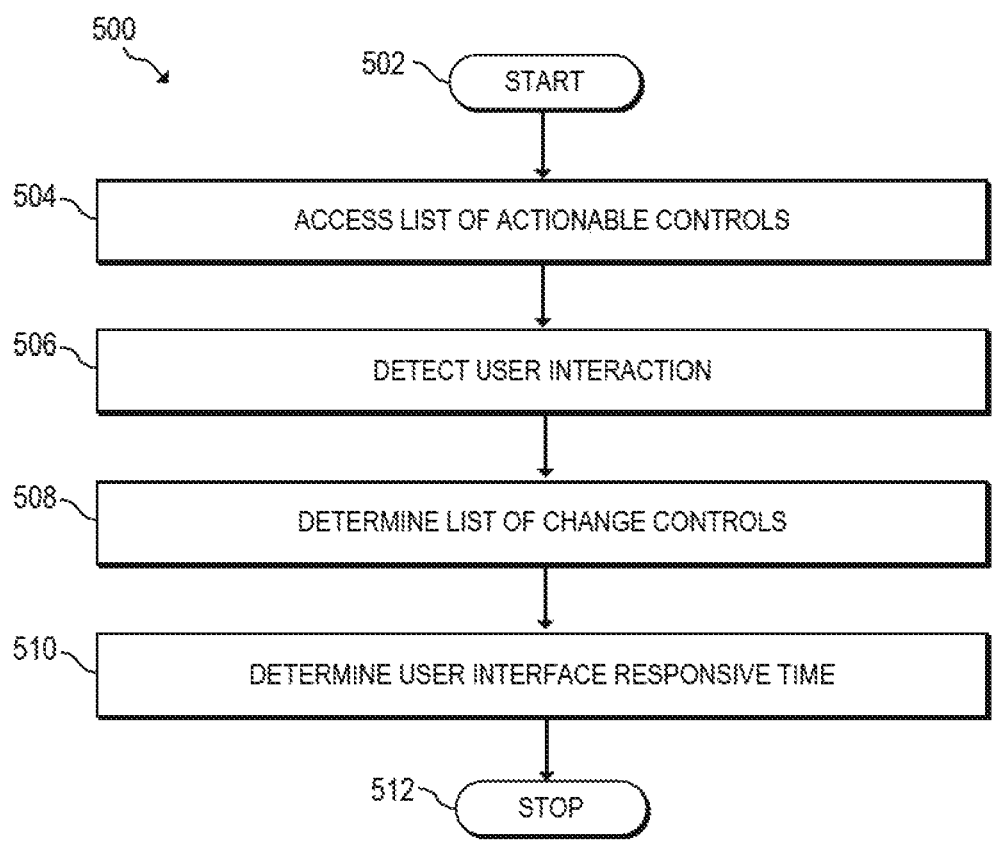
FIG. 5 is a flowchart of an example method for measuring user interface responsiveness.

FIG. 5 is a flowchart of an example method 500 for measuring user interface responsiveness. Method 500 may be described below as being executed or performed by a computing device, for example, computing device 600 of FIG. 6 or computing device 700 of FIG. 7. Other suitable systems and/or computing devices may be used as well (e.g., client 220 of FIG. 2). Method 500 may be implemented in the form of executable instructions stored on at least one machine-readable storage medium of the computing device and executed by at least one processor of the computing device. Alternatively or in addition, method 500 may be implemented in the form of electronic circuitry (e.g., hardware). In alternate embodiments of the present disclosure, one or more steps of method 500 may be executed substantially concurrently or in a different order than shown in FIG. 5. In alternate embodiments of the present disclosure, method 500 may include more or less steps than are shown in FIG. 5. In some embodiments, one or more of the steps of method 500 may, at certain times, be ongoing and/or may repeat.

Method 500 may start at step 502 and continue to step 504, where a computing device access a list of actionable controls, where the list may indicate at least one UI control of the UI as being actionable. At step 506, the computing device may detect a user interaction when a user interacts with a UI control of the UI. At step 508, the computing device may determine a list of change controls. Change controls are UI controls that change, refresh or load in response to the user interaction, which will ultimately be displayed on a next screen of the UI after the user interaction, and which are also on the list of actionable controls. At step 510, the computing device may determine a UI responsive time based on the list of change controls. Method 500 may eventually continue to step 512, where method 500 may stop.

Figure 6:
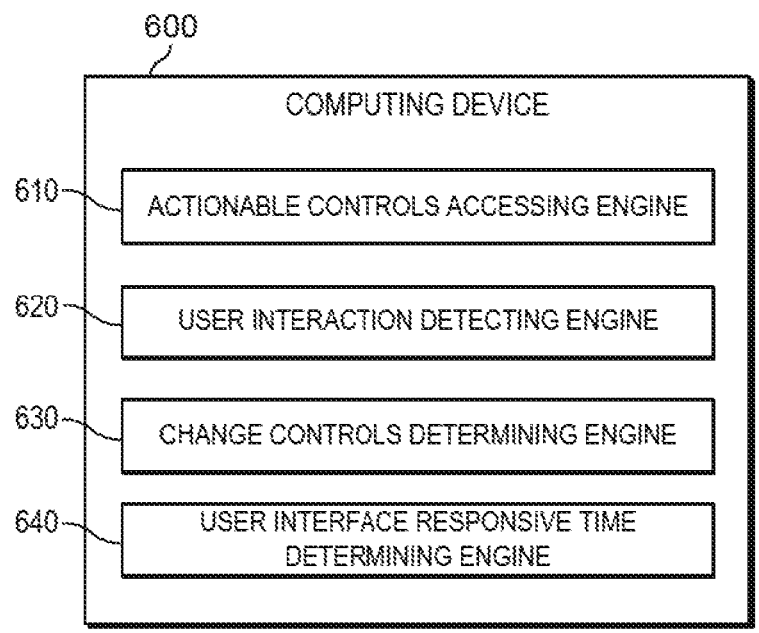
FIG. 6 is a block diagram of an example computing device for measuring user interface responsiveness.

FIG. 6 is a block diagram of an example computing device 600 for measuring user interface responsiveness. Computing device 600 may be similar to client 220 of FIG. 2. In the embodiment of FIG. 6, computing device 600 includes an actionable controls accessing engine 610, a user interface detecting engine 620, a change controls determining engine 630 and a user interface responsive time determining engine 640.

Actionable controls accessing engine 610 may access a list of actionable controls, for example, similar to actionable controls accessor 306 as described above. The list of actionable controls may indicate at least one UI control of the UI as being actionable. Actionable controls accessing engine 610 may be implemented in the form of executable instructions stored on at least one machine-readable storage medium of computing device 600 and executed by at least one processor of computing device 600. Alternatively or in addition, actionable controls accessing engine 610 may be implemented in the form of one or more hardware devices including electronic circuitry for implementing the functionality of actionable controls accessing engine 610.

User interaction detecting engine 620 may detect a user interaction when a user interacts with a UI control of the UI, for example, similar to interaction detector 308 as described above. User interaction detecting engine 620 may be implemented in the form of executable instructions stored on at least one machine-readable storage medium of computing device 600 and executed by at least one processor of computing device 600. Alternatively or in addition, user interaction detecting engine 620 may be implemented in the form of one or more hardware devices including electronic circuitry for implementing the functionality of user interaction detecting engine 620.

Change controls determining engine 630 may determine a list of change controls, for example, similar to rendered view analyzer 310 as described above. Change controls are UI controls that change, refresh or load in response to the user interaction, which will ultimately be displayed on a next screen of the UI after the user interaction, and which are also on the list of actionable controls. Change controls determining engine 630 may be implemented in the form of executable instructions stored on at least one machine-readable storage medium of computing device 600 and executed by at least one processor of computing device 600. Alternatively or in addition, change controls determining engine 630 may be implemented in the form of one or more hardware devices including electronic circuitry for implementing the functionality of change controls determining engine 630.

User interface responsive time determining engine 640 may determine a UI responsive time based on the list of change controls by determining when at least one of the change controls appears on the UI, for example, similar to UI responsiveness calculator 312 as described above. User interface responsive time determining engine 640 may be implemented in the form of executable instructions stored on at least one machine-readable storage medium of computing device 600 and executed by at least one processor of computing device 600. Alternatively or in addition, user interface responsive time determining engine 640 may be implemented in the form of one or more hardware devices including electronic circuitry for implementing the functionality of user interface responsive time determining engine 640.

Figure 7:
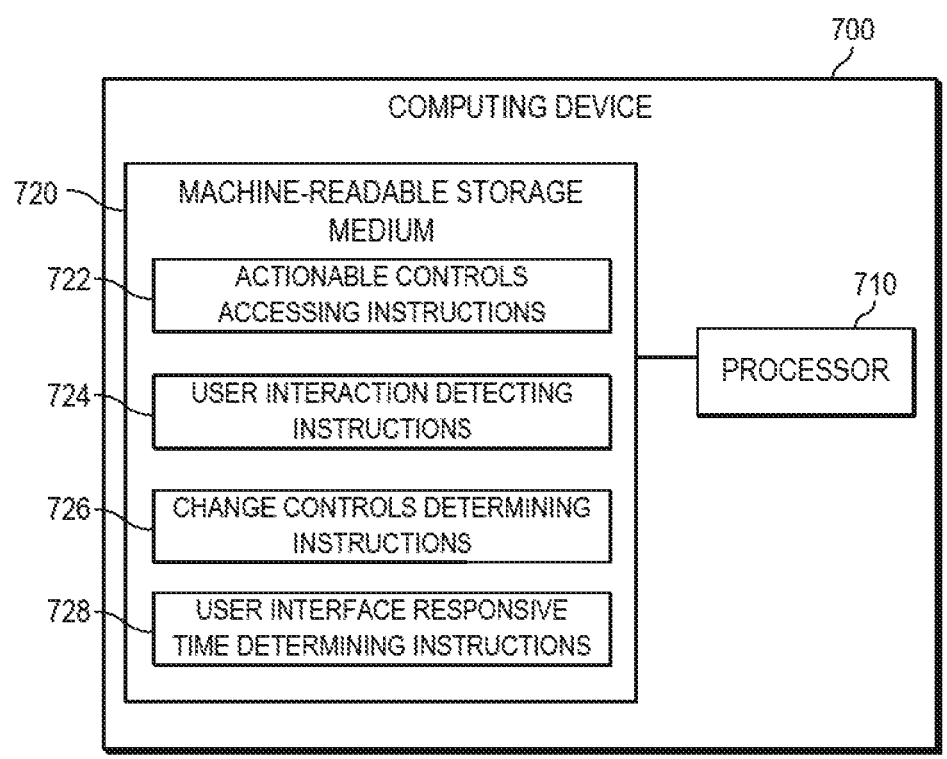
FIG. 7 is a block diagram of an example computing device for measuring user interface responsiveness.

FIG. 7 is a block diagram of an example computing device 700 for measuring user interface responsiveness. Computing device 700 may be similar to client 220 of FIG. 2. In the embodiment of FIG. 7, computing device 700 includes a processor 710 and a machine-readable storage medium 720. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 710 may be one or more central processing units (CPUs), microprocessors, and/or other hardware devices suitable for retrieval and execution of instructions stored in machine-readable storage medium 720. In the particular embodiment shown in FIG. 7, processor 710 may fetch, decode, and execute instructions 722, 724, 726, 728 to measure user interface responsiveness. As an alternative or in addition to retrieving and executing instructions, processor 710 may include one or more electronic circuits comprising a number of electronic components for performing the functionality of one or more of the instructions in machine-readable storage medium 720. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 720 may be any electronic, magnetic, optical, or other physical storage device that stores executable instructions. Thus, machine-readable storage medium 720 may be, for example, Random Access Memory (RAM), an Electrically-Erasable Programmable Read-Only Memory (EEPROM), a storage drive, an optical disc, and the like. Machine-readable storage medium 720 may be disposed within system 700, as shown in FIG. 7. In this situation, the executable instructions may be "installed" on the system 700. Alternatively, machine-readable storage medium 720 may be a portable, external or remote storage medium, for example, that allows system 700 to download the instructions from the portable/external/remote storage medium. In this situation, the executable instructions may be part of an "installation package". As described herein, machine-readable storage medium 720 may be encoded with executable instructions for measuring user interface responsiveness.

Referring to FIG. 7, actionable controls accessing instructions 722, when executed by a processor (e.g., 710), may cause system 700 to access a list of actionable controls, where the list may indicate at least one UI control of the UI as being actionable. User interaction detecting instructions 724, when executed by a processor (e.g., 710), may cause system 700 to detect a user interaction when a user interacts with a UI control of the UI. Change controls determining instructions 726, when executed by a processor (e.g., 710), may cause system 700 to determine a list of change controls. Change controls are UI controls that change, refresh or load in response to the user interaction, which will ultimately be displayed on a next screen of the UI after the user interaction, and which are also on the list of actionable controls. User interface responsive time determining instructions 728, when executed by a processor (e.g., 710), may cause system 700 to determine a UI responsive time based on the list of change controls. The UI responsive time may be related to when the UI is partially responsive to user interaction but not yet completely loaded.

The invention claimed is:

1. A method for measuring user interface (UI) responsiveness related to a UI of an application running on a computing device, the method comprising:
   accessing a list of actionable controls, the list indicating at least one UI control of the UI as being actionable;
   detecting a user interaction when a user interacts with a UI control of the UI;
   determining a list of change controls, which are UI controls that change, refresh or load in response to the user interaction, which will ultimately be displayed on a next screen of the UI after the user interaction, and which are also on the list of actionable controls; and
   determining a UI responsive time based on the list of change controls by determining when a first change control appears on the next screen of the UI.

2. The method of claim 1, further comprising receiving the list of actionable controls from a remote system, wherein the list of actionable controls indicates at least one UI control that multiple users commonly interact with.

3. The method of claim 2, wherein the list of actionable controls is based on crowd-sourced user interaction data from multiple computing devices.

4. The method of claim 1, wherein the list of actionable controls is based on user interaction data from multiple user sessions with the application running on the computing device.

5. The method of claim 1, further comprising sending user interaction data to a monitoring system such that the monitoring system can use this interaction data, along with interaction data from other computing devices, in a crowd-sourcing manner, to create or update the list of actionable controls.

6. The method of claim 5, wherein the user interaction data includes information about at least one UI control that is interacted with on the computing device.

7. The method of claim 1, wherein determining the UI responsive time includes determining when the first change control finishes loading on the next screen of the UI.

8. The method of claim 1, wherein the UI responsive time based on when the change control in the list of change controls appears on the UI comprises a duration of time corresponding to the user interaction, a duration of time corresponding to an initial user interface feedback, a duration of time corresponding to an entire user interface screen being busy, and a duration of time corresponding to when a partial portion of the next screen of the UI is loaded, such that the loaded portion of the next screen of the UI allows for user interaction.

9. The method of claim 1, wherein the list of actionable controls indicates at least one UI control that at least one user of the computing device commonly interacts with.

10. A computing device capable of measuring user interface (UI) responsiveness related to a UI of an application, the computing device comprising:
   a processing resource; and
   a non-transitory computer-readable medium storing machine-readable instructions executable by the processing resource to:
      access a list of actionable controls, the list indicating at least one UI control of the UI as being actionable;
      detect a user interaction when a user interacts with a UI control of the UI;
      determine a list of change controls, which are UI controls that change, refresh or load in response to the user interaction, which will ultimately be displayed on a next screen of the UI after the user interaction, and which are also on the list of actionable controls; and
      determine a UI responsive time based on the list of change controls by determining when at least one of the change controls appears on the next screen of the UI.

11. The computing device of claim 10, further comprising a user interaction data provider to send user interaction data to a monitoring system such that the monitoring system uses this interaction data, along with interaction data from other computing devices, in a crowd-sourcing manner, to create or update the list of actionable controls.

12. The computing device of claim 11, wherein the user interaction data includes information about at least one UI control that is interacted with on the computing device.

13. The computing device of claim 11, wherein the user interaction data includes a unique identifier for each of the at least one UI control.

14. The computing device of claim 10, wherein the list of actionable controls indicates at least one UI control that multiple users commonly interact with.

15. The computing device of claim 10, wherein the UI responsive time based on the list of change controls comprises a duration of time corresponding to the user interaction, a duration of time corresponding to an initial user interface feedback, a duration of time corresponding to an entire user interface screen being busy, and a duration of time corresponding to when a portion of the next screen of the UI is loaded, such that the loaded portion of the next screen of the UI allows for user interaction.

16. A machine-readable storage medium encoded with instructions for measuring user interface (UI) responsiveness related to a UI of an application running on a computing device, the instructions executable by a processor of the computing device to cause the computing device to:
   access a list of actionable controls, the list indicating at least one UI control of the UI as being actionable;
   detect a user interaction when a user interacts with a UI control of the UI;
   determine a list of change controls, which are UI controls that change, refresh or load in response to the user interaction, which will ultimately be displayed on a next screen of the UI after the user interaction, and which are also on the list of actionable controls; and
   determine a UI responsive time based on the list of change controls, wherein the UI responsive time is related to when some of the UI controls are visible and able to accept user interaction but not yet completely loaded, wherein the UI responsive time based on the list of change controls comprises a duration of time corresponding to the user interaction, a duration of time corresponding to an initial user interface feedback, a duration of time corresponding to an entire user interface screen being busy, and a duration of time corresponding to when a portion of the next screen of the UI is loaded, such that the loaded portion of the next screen of the UI allows for user interaction.

17. The machine-readable storage medium of claim 16, wherein the determination of the UI responsive time includes determining when at least one of the change controls appears on the next screen of the UI.

18. The machine-readable storage medium of claim 16, wherein the determination of the UI responsive time includes determining when a first change control appears on the next screen of the UI.

19. The machine-readable storage medium of claim 16, wherein the detection of the user interaction and the determination of the list of change controls includes using hooks that provide information about the UI.

20. The machine-readable storage medium of claim 19, wherein the hooks that provide information about the UI include at least one of when a user interacts with the UI; when the next screen is displayed on the UI; and when a UI view of the UI is changed, refreshed or loaded.

* * * * *